US011183690B2

(12) United States Patent
Wang et al.

(10) Patent No.: US 11,183,690 B2
(45) Date of Patent: Nov. 23, 2021

(54) PROTECTIVE LAYERS COMPRISING METALS FOR ELECTROCHEMICAL CELLS

(71) Applicant: Sion Power Corporation, Tucson, AZ (US)

(72) Inventors: Zhongchun Wang, Sunnyvale, CA (US); Hui Du, Tucson, AZ (US); Chariclea Scordilis-Kelley, Tucson, AZ (US); Tracy Earl Kelley, Tucson, AZ (US); Marina Safont-Sempere, Mannheim (DE); Holger Schneider, Ludwigshafen (DE); Thomas Weiss, Ilvesheim (DE)

(73) Assignee: Sion Power Corporation, Tucson, AZ (US)

( * ) Notice: Subject to any disclaimer, the term of this patent is extended or adjusted under 35 U.S.C. 154(b) by 259 days.

(21) Appl. No.: 16/470,708

(22) PCT Filed: Dec. 22, 2017

(86) PCT No.: PCT/US2017/068181
§ 371 (c)(1),
(2) Date: Jun. 18, 2019

(87) PCT Pub. No.: WO2018/119392
PCT Pub. Date: Jun. 28, 2018

(65) Prior Publication Data
US 2019/0348672 A1 Nov. 14, 2019

Related U.S. Application Data

(60) Provisional application No. 62/438,820, filed on Dec. 23, 2016.

(51) Int. Cl.
*H01M 4/40* (2006.01)
*H01M 4/04* (2006.01)
(Continued)

(52) U.S. Cl.
CPC ......... *H01M 4/405* (2013.01); *H01M 4/0461* (2013.01); *H01M 4/366* (2013.01); *H01M 4/5835* (2013.01)

(58) Field of Classification Search
CPC .. H01M 4/0416; H01M 4/0461; H01M 4/134; H01M 4/0495; H01M 4/5835;
(Continued)

(56) References Cited

U.S. PATENT DOCUMENTS

| 4,664,991 A | 5/1987 | Perichaud et al. |
| 4,739,018 A | 4/1988 | Armand et al. |

(Continued)

FOREIGN PATENT DOCUMENTS

| KR | 10-2014-0125970 A | 10/2014 |
| KR | 2014-0125970 | * 10/2014 |

(Continued)

OTHER PUBLICATIONS

PCT/US2017/068181, Apr. 23, 2018, International Search Report and Written Opinion.
(Continued)

*Primary Examiner* — Brittany L Raymond
(74) *Attorney, Agent, or Firm* — Wolf, Greenfield & Sacks, P.C.

(57) ABSTRACT

Articles and methods involving protected electrode structures are generally provided. In some embodiments, a protected electrode structure includes an electrode comprising an alkali metal and a protective structure directly adjacent the electrode. In some embodiments, the protective structure comprises elemental carbon and intercalated ions. In some embodiments, the protective structure is a composite protective structure. The composite structure may comprise an alloy comprising an alkali metal, an oxide of an alkali metal, and/or a fluoride salt of an alkali metal.

17 Claims, 8 Drawing Sheets

(51) Int. Cl.
*H01M 4/36* (2006.01)
*H01M 4/583* (2010.01)

(58) Field of Classification Search
CPC ...... H01M 4/1395; H01M 4/38; H01M 4/366; H01M 4/45; H01M 4/58; H01M 10/052; Y02E 60/10; C23C 18/00
See application file for complete search history.

(56) References Cited

U.S. PATENT DOCUMENTS

| | | | |
|---|---|---|---|
| 4,833,048 A | 5/1989 | DeJonghe et al. | |
| 4,917,974 A | 4/1990 | DeJonghe et al. | |
| 5,162,175 A | 11/1992 | Visco et al. | |
| 5,194,341 A | 3/1993 | Bagley et al. | |
| 5,324,599 A | 6/1994 | Oyama et al. | |
| 5,387,479 A | 2/1995 | Koksbang | |
| 5,441,831 A | 8/1995 | Okamoto et al. | |
| 5,516,598 A | 5/1996 | Visco et al. | |
| 5,529,860 A | 6/1996 | Skotheim et al. | |
| 5,538,812 A | 7/1996 | Lee et al. | |
| 5,601,947 A | 2/1997 | Skotheim et al. | |
| 5,648,187 A | 7/1997 | Skotheim | |
| 5,690,702 A | 11/1997 | Skotheim et al. | |
| 5,723,230 A | 3/1998 | Naoi et al. | |
| 5,783,330 A | 7/1998 | Naoi et al. | |
| 5,792,575 A | 8/1998 | Naoi et al. | |
| 5,882,819 A | 3/1999 | Naoi et al. | |
| 5,919,587 A | 7/1999 | Mukherjee et al. | |
| 5,961,672 A | 10/1999 | Skotheim et al. | |
| 6,117,590 A | 9/2000 | Skotheim et al. | |
| 6,153,337 A | 11/2000 | Carlson et al. | |
| 6,201,100 B1 | 3/2001 | Gorkovenko et al. | |
| 6,238,821 B1 | 5/2001 | Mukherjee et al. | |
| 6,306,545 B1 | 10/2001 | Carlson et al. | |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,688,075 B2 | 3/2010 | Kelley et al. | |
| 7,771,870 B2 | 8/2010 | Affinito et al. | |
| 7,785,730 B2 | 8/2010 | Affinito et al. | |
| 7,939,198 B2 | 5/2011 | Mukherjee et al. | |
| 8,076,024 B2 | 12/2011 | Affinito et al. | |
| 8,084,102 B2 | 12/2011 | Affinito | |
| 8,087,309 B2 | 1/2012 | Kelley et al. | |
| 8,105,717 B2 | 1/2012 | Skotheim et al. | |
| 8,197,971 B2 | 6/2012 | Skotheim et al. | |
| 8,264,205 B2 | 9/2012 | Kopera | |
| 8,338,034 B2 | 12/2012 | Affinito et al. | |
| 8,415,054 B2 | 4/2013 | Skotheim et al. | |
| 8,603,680 B2 | 12/2013 | Affinito et al. | |
| 8,617,748 B2 | 12/2013 | Mikhaylik et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 8,871,387 B2 | 10/2014 | Wang et al. | |
| 8,936,870 B2 | 1/2015 | Affinito et al. | |
| 8,968,928 B2 | 3/2015 | Wang et al. | |
| 9,005,311 B2 | 4/2015 | Safont et al. | |
| 9,005,809 B2 | 4/2015 | Wilkening et al. | |
| 9,034,421 B2 | 5/2015 | Mikhaylik et al. | |
| 9,040,197 B2 | 5/2015 | Affinito et al. | |
| 9,040,201 B2 | 5/2015 | Affinito et al. | |
| 9,065,149 B2 | 6/2015 | Skotheim et al. | |
| 9,077,041 B2 | 7/2015 | Burnside et al. | |
| 9,105,938 B2 | 8/2015 | Scordilis-Kelley et al. | |
| 9,214,678 B2 | 12/2015 | Mikhaylik | |
| 9,397,342 B2 | 7/2016 | Skotheim et al. | |
| 9,419,274 B2 | 8/2016 | Wilkening et al. | |
| 9,490,478 B2 | 11/2016 | Mikhaylik et al. | |
| 9,531,009 B2 | 12/2016 | Kumaresan et al. | |
| 9,548,492 B2 | 1/2017 | Affinito et al. | |
| 9,559,348 B2 | 1/2017 | Kumaresan et al. | |
| 9,577,243 B2 | 2/2017 | Schmidt et al. | |
| 9,577,267 B2 | 2/2017 | Scordilis-Kelley et al. | |
| 9,653,735 B2 | 5/2017 | Skotheim et al. | |
| 9,653,750 B2 | 5/2017 | Laramie et al. | |
| 9,711,784 B2 | 7/2017 | Kelley et al. | |
| 9,728,768 B2 | 8/2017 | Mikhaylik et al. | |
| 9,735,411 B2 | 8/2017 | Viner et al. | |
| 9,755,268 B2 | 9/2017 | Fleischmann et al. | |
| 9,780,404 B2 | 10/2017 | Scordilis-Kelley et al. | |
| 9,825,328 B2 | 11/2017 | Du et al. | |
| 9,853,287 B2 | 12/2017 | Mikhaylik et al. | |
| 9,947,963 B2 | 4/2018 | Du et al. | |
| 9,994,959 B2 | 6/2018 | Laramie et al. | |
| 9,994,960 B2 | 6/2018 | Laramie et al. | |
| 10,020,479 B2 | 7/2018 | Mikhaylik et al. | |
| 10,020,512 B2 | 7/2018 | Gronwald et al. | |
| 10,050,308 B2 | 8/2018 | Liao et al. | |
| 10,069,135 B2 | 9/2018 | Fleischmann et al. | |
| 10,069,146 B2 | 9/2018 | Skotheim et al. | |
| 10,122,043 B2 | 11/2018 | Du et al. | |
| 10,243,202 B2 | 3/2019 | Fleischmann et al. | |
| 10,312,545 B2 | 6/2019 | Scordilis-Kelley et al. | |
| 10,319,988 B2 | 6/2019 | Kelley et al. | |
| 10,320,027 B2 | 6/2019 | Scordilis-Kelley et al. | |
| 10,320,031 B2 | 6/2019 | Mikhaylik et al. | |
| 10,333,134 B2 | 6/2019 | Mikhaylik et al. | |
| 10,333,149 B2 | 6/2019 | Affinito et al. | |
| 2001/0041294 A1 | 11/2001 | Chu et al. | |
| 2005/0100792 A1 | 5/2005 | Visco et al. | |
| 2005/0196672 A1 | 9/2005 | Mukherjee et al. | |
| 2006/0115579 A1 | 6/2006 | Mukherjee et al. | |
| 2007/0221265 A1 | 9/2007 | Affinito et al. | |
| 2008/0318128 A1 | 12/2008 | Simoneau et al. | |
| 2009/0035646 A1 | 2/2009 | Mikhaylik et al. | |
| 2009/0055110 A1 | 2/2009 | Kelley et al. | |
| 2010/0239914 A1 | 9/2010 | Mikhaylik et al. | |
| 2011/0006738 A1 | 1/2011 | Mikhaylik et al. | |
| 2011/0014524 A1 | 1/2011 | Skotheim et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0159376 A1 | 6/2011 | Skotheim et al. | |
| 2011/0165471 A9 | 7/2011 | Skotheim et al. | |
| 2011/0177398 A1 | 7/2011 | Affinito et al. | |
| 2011/0206992 A1 | 8/2011 | Campbell et al. | |
| 2011/0256450 A1 | 10/2011 | Campbell et al. | |
| 2012/0048729 A1 | 3/2012 | Mikhaylik et al. | |
| 2012/0052339 A1 | 3/2012 | Mikhaylik et al. | |
| 2012/0052397 A1 | 3/2012 | Mikhaylik et al. | |
| 2012/0070746 A1 | 3/2012 | Mikhaylik et al. | |
| 2012/0082872 A1 | 4/2012 | Schmidt et al. | |
| 2012/0082901 A1 | 4/2012 | Schmidt et al. | |
| 2013/0095380 A1 | 4/2013 | Affinito et al. | |
| 2013/0164635 A1 | 6/2013 | Schmidt et al. | |
| 2013/0309571 A1 | 11/2013 | Yoon et al. | |
| 2013/0316072 A1 | 11/2013 | Scordilis-Kelley et al. | |
| 2014/0062411 A1 | 3/2014 | Mikhaylik et al. | |
| 2014/0079994 A1 | 3/2014 | Affinito et al. | |
| 2014/0127419 A1 | 5/2014 | Fleischmann et al. | |
| 2014/0127577 A1 | 5/2014 | Fleischmann et al. | |
| 2014/0220439 A1* | 8/2014 | Badding | H01M 4/381 429/216 |
| 2014/0272565 A1 | 9/2014 | Gronwald et al. | |
| 2014/0272594 A1 | 9/2014 | Safont et al. | |
| 2014/0272595 A1 | 9/2014 | Cristadoro et al. | |
| 2014/0272597 A1 | 9/2014 | Mikhaylik et al. | |
| 2014/0293507 A1 | 10/2014 | Gadkaree et al. | |
| 2015/0010804 A1 | 1/2015 | Laramie et al. | |
| 2015/0044517 A1* | 2/2015 | Mikhaylik | H01M 4/366 429/49 |
| 2015/0086837 A1 | 3/2015 | Laramie et al. | |
| 2015/0155546 A1* | 6/2015 | Yushin | H01M 4/1397 427/78 |
| 2015/0162586 A1 | 6/2015 | Fleischmann et al. | |
| 2015/0180037 A1 | 6/2015 | Gronwald et al. | |
| 2015/0180084 A1 | 6/2015 | Scordilis-Kelley et al. | |
| 2015/0188194 A1 | 7/2015 | Mikhaylik et al. | |
| 2015/0236320 A1 | 8/2015 | Laramie et al. | |
| 2015/0236322 A1 | 8/2015 | Laramie et al. | |

(56) References Cited

U.S. PATENT DOCUMENTS

| | | |
|---|---|---|
| 2015/0280277 A1 | 10/2015 | Fleischmann et al. |
| 2015/0287986 A1 | 10/2015 | Affinito et al. |
| 2015/0287998 A1 | 10/2015 | Scordilis-Kelley et al. |
| 2015/0318539 A1 | 11/2015 | Kelley et al. |
| 2015/0349310 A1 | 12/2015 | Viner et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0301080 A1 | 10/2016 | Skotheim et al. |
| 2016/0344067 A1 | 11/2016 | Laramie et al. |
| 2017/0018815 A1 | 1/2017 | Laramie et al. |
| 2017/0047590 A1 | 2/2017 | Mikhaylik et al. |
| 2017/0141385 A1 | 5/2017 | Scordilis-Kelley et al. |
| 2017/0141402 A1 | 5/2017 | Affinito et al. |
| 2017/0141442 A1 | 5/2017 | Mikhaylik et al. |
| 2017/0149086 A1 | 5/2017 | Du et al. |
| 2017/0200975 A1 | 7/2017 | Liao et al. |
| 2017/0250390 A1 | 8/2017 | Laramie et al. |
| 2017/0288208 A1 | 10/2017 | Kelley et al. |
| 2017/0338475 A1 | 11/2017 | Laramie et al. |
| 2017/0352863 A1 | 12/2017 | Mikhaylik et al. |
| 2017/0373321 A1 | 12/2017 | Skotheim et al. |
| 2018/0006303 A1 | 1/2018 | Mikhaylik et al. |
| 2018/0034100 A1 | 2/2018 | Du et al. |
| 2018/0048018 A1 | 2/2018 | Scordilis-Kelley et al. |
| 2018/0138542 A1 | 5/2018 | Bunte et al. |
| 2018/0198162 A1 | 7/2018 | Du et al. |
| 2018/0230610 A1 | 8/2018 | Laramie et al. |
| 2018/0254516 A1 | 9/2018 | Han et al. |
| 2018/0261820 A1 | 9/2018 | Liao et al. |
| 2018/0269520 A1 | 9/2018 | Scordilis-Kelley et al. |
| 2018/0277850 A1 | 9/2018 | Quero-Mieres et al. |
| 2018/0287122 A1 | 10/2018 | Mikhaylik et al. |
| 2018/0301697 A1 | 10/2018 | Affinito et al. |
| 2018/0337406 A1 | 11/2018 | Mudalige et al. |
| 2018/0342766 A1 | 11/2018 | Du et al. |
| 2018/0351148 A1 | 12/2018 | Schneider et al. |
| 2018/0351158 A1 | 12/2018 | Liao et al. |
| 2018/0358651 A1 | 12/2018 | Liao et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |

FOREIGN PATENT DOCUMENTS

| | | |
|---|---|---|
| WO | WO 1999/033125 A1 | 7/1999 |
| WO | WO 1999/033130 A1 | 7/1999 |
| WO | WO 2007/111895 A2 | 10/2007 |

OTHER PUBLICATIONS

PCT/US2017/068181, Jul. 4, 2019, International Preliminary Report on Patentability.

EP 17210318.6, Apr. 12, 2018, Extended European Search Report.

International Search Report and Written Opinion for PCT/US2017/068181 dated Apr. 23, 2018.

International Preliminary Report on Patentability for PCT/US2017/068181 dated Jul. 4, 2019.

Extended European Search Report and Written Opinion for EP App. No. 17210318.6 dated Apr. 12, 2018.

Alamgir et al., Lithium Batteries, New Materials, Developments and Perspectives, Chapter 3. Elsevier, Amsterdam. 1994; 93-136.

Brunauer et al., Adsorption of Gases in Multimolecular Layers. J Am Chem Soc. 1938;60(2):309-19.

Choudhury et al., Electroless Formation of Hybrid Lithium Anodes for Fast Interfacial Ion Transport. Angewandte Chemie Int. Ed. 2017;56:13070-7.

Dominey, Lithium Batteries, New Materials, Developments and Perspectives, Chapter 4. Elsevier, Amsterdam. 1994; 137-165.

Huang et al., Manipulating surface reactions in lithium-Sulphur batteries using hybrid anode structures. Nature Communications 5:3015. Jan. 2014:7 pages.

Ishikawa et al., In Situ Scanning Vibrating Electrode Technique for the Characterization of Interface Between Lithium Electrode and Electrolytes Containing Additives. J. Electrochem. Soc. Dec. 1994;141(12):L159-61.

Ishikawa et al., In situ scanning vibrating electrode technique for lithium metal anodes. Journal of Power Sources. 1997;68:501-5.

Ishikawa et al., Pretreatment of Li metal anode with electrolyte additive for enhancing Li cycleability. Journal of Power Sources. 2005;146:199-203.

Liang et al., A facile surface chemistry route to a stabilized lithium metal anode. Nature Energy. 2017;2:17119. 7 pages.

Marchioni et al,. Protection of Lithium Metal Surfaces Using Chlorosilanes. Langmuir. 2007;23:11597-602.

Shiraishi et al., Influence of initial surface condition of lithium metal anodes on surface modification with HF. Journal of Applied Electrochemistry. 1999;29:869-81.

Wu et al., Effects of combinatorial $AlCl_3$ and pyrrole on the SEI formation and electrochemical performance of Li electrode. Electrochimica Acta. 2013;103:199-205.

\* cited by examiner

PROTECTIVE LAYERS COMPRISING METALS FOR ELECTROCHEMICAL CELLS

RELATED APPLICATIONS

This application is a U.S. National Stage patent application based on International Application PCT/US2017/068181, filed Dec. 22, 2017, which claims priority to U.S. Provisional Application 62/438,820, filed Dec. 23, 2016, which are incorporated herein by reference in their entirety.

FIELD

Articles and methods involving protected electrode structures are generally provided.

SUMMARY

Articles and methods involving protected electrode structures are generally provided. The subject matter disclosed herein involves, in some cases, interrelated products, alternative solutions to a particular problem, and/or a plurality of different uses of one or more systems and/or articles.

In one set of embodiments, protected electrode structures are provided. In some embodiments, a protected electrode structure comprises an electrode and a composite protective structure. The electrode may comprise an alkali metal. The composite protective structure may comprise an alloy comprising the alkali metal and an oxide of the alkali metal.

In some embodiments, a protected electrode structure comprises an electrode and a composite protective structure. The electrode may comprise an alkali metal. The composite protective structure may comprise an alloy comprising the alkali metal and a fluoride salt of the alkali metal, wherein the fluoride salt of the alkali metal makes up greater than or equal to 0.1 wt % of the composite protective structure.

In some embodiments, a protected electrode structure comprises an electrode and a protective structure. The electrode may comprise an alkali metal. The protective structure may be directly adjacent the electrode, and may comprise elemental carbon and intercalated ions of the alkali metal.

Certain embodiments relate to methods for forming protected electrode structures. In some embodiments, a method comprises exposing an electrode comprising an alkali metal to a liquid comprising a plurality of particles, wherein the plurality of particles comprises at least one of a metal-containing species and a metalloid-containing species, and forming a composite protective structure on the electrode, wherein the composite protective structure comprises an alloy comprising the alkali metal.

In some embodiments, a method comprises exposing an electrode comprising an alkali metal to a liquid comprising a metal fluoride salt or a metalloid fluoride salt, and forming a composite protective structure on the electrode, wherein the composite protective structure comprises an alloy comprising the alkali metal and a fluoride salt of the alkali metal.

In some embodiments, a method comprises exposing an electrode comprising an alkali metal to a liquid comprising a plurality of particles, wherein the plurality of particles comprises elemental carbon, and forming a protective structure on the electrode, wherein the protective structure comprises the elemental carbon.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Articles and methods involving protected electrode structures are generally provided. For instance, a protected electrode structure may comprise an electrode and a protective structure directly adjacent to the electrode. The protective structure may serve to protect the electrode from undesirable reactions with one or more species in the electrochemical cell (e.g., an electrolyte), and/or to prevent or substantially reduce the exposure of the electrode to an electrolyte. In some embodiments, the protective structure may be capable of transporting ions which participate in electrochemical reactions (e.g., from a side of the protective structure proximate an electrolyte to an opposite side of the protective structure proximate the electrode) and/or may be ionically conductive. The protective structure may also have one or more other properties that result in improved cell performance. For instance, the protective structure may be connected to the electrode by bonding sufficiently strong to prevent its delamination during typical handling and electrochemical cell cycling. As another example, the protective structure may have good flexibility and may be capable of accommodating typical changes in size of the electrode during electrochemical cell cycling (e.g., electrode expansion during discharging, electrode contraction during charging) while still maintaining its protective functionality (e.g., by not undergoing fracture). In some embodiments, the protective structure may form a stable solid electrolyte interface when positioned in an electrochemical cell. Compositions of protective structures with particular utility and advantageous methods for forming protective structures are described in more detail below.

Figure 1:
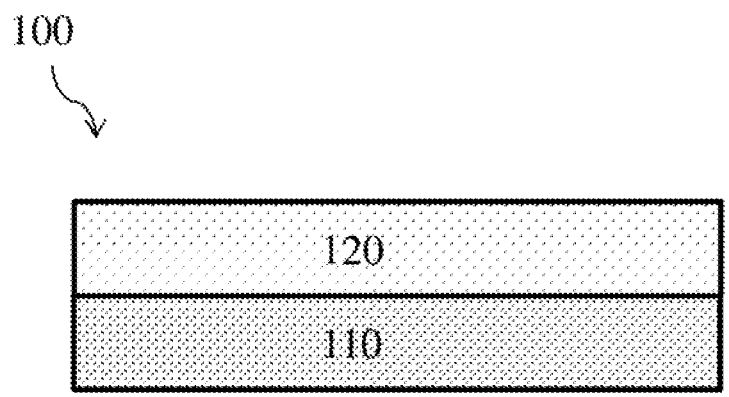
FIG. 1 shows a protected electrode structure comprising an electrode and a protective structure (e.g., a protective layer) according to certain embodiments.

FIG. 1 depicts a protected electrode structure 100 according to some embodiments of the invention. As shown illustratively in this figure, protected electrode structure 100 comprises electrode 110 and protective structure 120 adjacent to electrode 110. The protective structure may protect the electrode by, for example, preventing exposure of the electrode to an electrolyte. In some embodiments, the protective structure may be substantially impermeable to an electrolyte.

In some embodiments, the protective structure is directly adjacent to the electrode. An electrochemical cell component (e.g., an electrode, a protected electrode structure) referred to as being "disposed on," "disposed between," "on," or "adjacent" another electrochemical cell component(s) means that it can be directly disposed on, disposed between, on, or adjacent the electrochemical cell component(s), or an intervening electrochemical cell component may also be present. For example, an additive electrochemical cell component (e.g., a protective structure) described herein that is adjacent an electrode may be directly adjacent (e.g., may be in direct physical contact with) the electrode, or an intervening electrochemical cell component (e.g., a passivation layer) may be positioned between the electrode and the additive layer. An electrochemical cell component that is "directly adjacent," "directly on," or "in contact with," another electrochemical cell component means that no intervening electrochemical cell component is present. It should also be understood that when an electrochemical cell component is referred to as being "disposed on," "disposed between," "on," or "adjacent" another electrochemical cell component(s), it may be covered by, on or adjacent the entire electrochemical cell component(s) or a part of the electrochemical cell component(s).

The protective electrode may be formed such that protective structure 120 is integrally connected with electrode 110 (e.g., the electroactive portion). For example, the structure may be formed such that there is no clear distinction between when the protective structure starts and ends and where the electrode starts and ends (e.g., no distinct, separate electroactive and protective layers). In some cases, integrally connected components have a cohesive/adhesive strength between two materials that is at least as great as the yield strength of each of the materials (e.g., the electroactive material and the material used to form the protected electrode).

Although depicted as a homogeneous structure in FIG. 1, a protective structure should be understood to possibly comprise more than one constituent materials in some embodiments (i.e., the protective structure can be a composite protective structure). For example, the protective structure may comprise at least two constituent materials, at least three constituent materials, or more constituent materials. As used herein, a constituent material should be understood to refer to any species that includes only a single phase (e.g., a metal, an alloy, a ceramic, a polymer, or a solution). That is, a single constituent material should not be understood to encompass mixtures, composites, and the like. Materials such as mixtures and composites should be understood to comprise at least two constituent materials. In some embodiments, two or more constituent materials such as an alloy (e.g., a first constituent material) and a ceramic (e.g., a second constituent material) may form a cross-linked structure.

If the protective structure comprises at least two constituent materials, they may be disposed with respect to each other in any suitable manner. For instance, a protective structure may comprise at least two constituent materials and the first constituent material may surround the second constituent material (e.g., in a core shell structure), the first substance may form a matrix in which the second constituent material is disposed, and/or both the first constituent material and the second constituent material may form interpenetrating networks that span the protective structure (or at least 50 vol % of the protective structure, at least 75 vol % of the protective structure, at least 90 vol % of the protective structure, at least 95% of the protective structure, or at least 99 vol % of the protective structure). That is, the first and second constituent materials may both form networks that are topologically connected, and each network may be enclosed by a volume that spans at least 50% of the protective structure, at least 75% of the protective structure, at least 90% of the protective structure, at least 95% of the protective structure, at least 99% of the protective structure, or the entirety of the protective structure.

In some embodiments, as will be described in further detail below, a protective structure may comprise pores and/or particles. In such cases, the arrangement of two or more constituent materials with respect to each other should be understood to refer to any or all of the arrangement of the constituent materials within individual particles, the arrangement of the constituent materials within a matrix surrounding the pores, and the arrangement of the constituent materials within the protective structure as a whole.

In some embodiments, a protective structure may comprise exactly one constituent material.

In some embodiments, each constituent material of a protective structure may be a material that is not a precursor material. That is, the protective structure may be formed from one or more precursor materials (e.g., halide salts such as fluoride salts; particles such as particles that comprise a metal oxide, a metalloid oxide, and/or a metal) and none of the precursor materials may be present in the protective structure. However, in other embodiments, the protective structure may comprise one or more precursor materials (e.g., the protective structure may comprise a halide salt such as a non-alkali (e.g., non-lithium) fluoride salt, a metal or metalloid oxide, or a metal or metalloid). In some embodiments, the protective structure may comprise metal-containing species, such as a metal oxide or a metal in a metallic phase. In some embodiments, the protective structure may comprise metalloid-containing species, such as a metalloid oxide or a metalloid in a metalloid phase.

In some embodiments, a protective structure (e.g., a protective structure formed by a method described herein, a composite protective structure) may comprise at least one alloy (a metal alloy). Typically, an alloy included in the protective structure comprises at least two species. The first species includes a metal that is also included in the electrode (e.g., an alkali metal such as lithium). The alloy also includes a second species. In some embodiments, the second species is not included in the electrode, or is included in the electrode is small amounts (e.g., less than or equal to 10 wt %, less than or equal to 8 wt %, less than or equal to 6 wt %, less than or equal to 4 wt %, less than or equal to 2 wt %, or less than or equal to 1 wt % with respect to the weight of the electrode). Other optional components may also be present in the alloy. In some embodiments, the second species may be a metal (e.g., an alkaline earth metal, a transition metal, a post transition metal) or a metalloid. Non-limiting examples of suitable metals and metalloids include Sn, Zn, In, Al, Mg, Ga, Ag, Cd, Pb, Bi, Sb, Si, Ge, and As. In some embodiments, the second species is a non-alkali metal. In some embodiments, the protective structure may include one or more of the following alloys: $Li_3Sb$, $Li_4Sn$, $LiZn$, and $LiZn_{13}$, $LiAl_3$, $Li_3In$, $LiMg$, $LiGa$, $LiAg$, $Li_2Cd$, $Li_2Pb$, $Li_3Bi$, $Li_4Si$, $Li_4Ge$, $Li_3As$.

In some embodiments, a protective structure (e.g., a protective structure formed by a method described herein, a composite protective structure) may comprise at least one alloy and the alloy may make up greater than or equal to 30 wt % of the protective structure, greater than or equal to 40 wt % of the protective structure, greater than or equal to 50 wt % of the protective structure, greater than or equal to 60 wt % of the protective structure, greater than or equal to 70 wt % of the protective structure, greater than or equal to 80 wt % of the protective structure, greater than or equal to 90 wt % of the protective structure, greater than or equal to 95 wt % of the protective structure, greater than or equal to 97.5 wt % of the protective structure, greater than or equal to 99 wt % of the protective structure, greater than or equal to or 99.5 wt % of the protective structure. In some embodiments, a protective structure may comprise at least one alloy and the alloy may make up less than or equal to 99.9 wt % of the protective structure, less than or equal to 99.5 wt % of the protective structure, less than or equal to 99 wt % of the protective structure, less than or equal to 97.5 wt % of the protective structure, less than or equal to 95 wt % of the protective structure, less than or equal to 90 wt % of the protective structure, less than or equal to 80 wt % of the protective structure, less than or equal to 70 wt % of the protective structure, less than or equal to 60 wt % of the protective structure, less than or equal to 50 wt % of the protective structure, or less than or equal to 40 wt % of the protective structure. Combinations of the above-referenced ranges are also possible (e.g., greater than or equal to 30 wt % and less than or equal to 99.9 wt %, or greater than or equal to 50 wt % and less than or equal to 90 wt %). Other ranges are also possible.

In some embodiments, a protective structure (e.g., a protective structure formed by a method described herein, a composite protective structure) includes an alloy that comprises an alkali metal (e.g., the same alkali metal that is included in the electrode), which may be a first species of the alloy, and the alkali metal (e.g., first species) makes up greater than or equal to 0.001 wt % of the alloy, greater than or equal to 0.002 wt % of the alloy, greater than or equal to 0.005 wt % of the alloy, greater than or equal to 0.01 wt % of the alloy, greater than or equal to 0.02 wt % of the alloy, greater than or equal to 0.05 wt % of the alloy, greater than or equal to 0.1 wt % of the alloy, greater than or equal to 0.2 wt % of the alloy, greater than or equal to 0.5 wt % of the alloy, greater than or equal to 1 wt % of the alloy, greater than or equal to 2 wt % of the alloy, greater than or equal to 5 wt % of the alloy, greater than or equal to 10 wt % of the alloy, or greater than or equal to 20 wt % of the alloy. In some embodiments, the alkali metal (e.g., first species) makes up less than or equal to 50 wt % of the alloy, less than or equal to 20 wt % of the alloy, less than or equal to 10 wt % of the alloy, less than or equal to 5 wt % of the alloy, less than or equal to 2 wt % of the alloy, less than or equal to 1 wt % of the alloy, less than or equal to 0.5 wt % of the alloy, less than or equal to 0.2 wt % of the alloy, less than or equal to 0.1 wt % of the alloy, less than or equal to 0.05 wt % of the alloy, less than or equal to 0.02 wt % of the alloy, less than or equal to 0.01 wt % of the alloy, less than or equal to 0.005 wt % of the alloy, or less than or equal to 0.002 wt % of the alloy. Combinations of the above-referenced ranges are also possible (e.g., greater than or equal to 0.001 wt % of the alloy and less than or equal to 50 wt % of the alloy). Other ranges are also possible.

In some embodiments, a protective structure (e.g., a protective structure formed by a method described herein, a composite protective structure) includes an alloy comprising a second species (e.g., a non-alkali metal), and the second species makes up greater than or equal to 50 wt % of the alloy, greater than or equal to 75 wt % of the alloy, greater than or equal to 90 wt % of the alloy, greater than or equal to 95 wt % of the alloy, greater than or equal to 99 wt % of the alloy, greater than or equal to 99.5 wt % of the alloy, greater than or equal to 99.9 wt % of the alloy, greater than or equal to 99.95 wt % of the alloy, or greater than or equal to 99.99 wt % of the alloy. In some embodiments, the second species (e.g., non-alkali metal) makes up less than or equal to 99.995 wt % of the alloy, less than or equal to 99.99 wt % of the alloy, less than or equal to 99.95 wt % of the alloy, less than or equal to 99.9 wt % of the alloy, less than or equal to 99.5 wt % of the alloy, less than or equal to 99 wt % of the alloy, less than or equal to 95 wt % of the alloy, less than or equal to 90 wt % of the alloy, or less than or equal to 75 wt % of the alloy. Combinations of the above-referenced ranges are also possible (e.g., greater than or equal to 50 wt % of the alloy and less than or equal to 99.995 wt % of the alloy). Other ranges are also possible.

In some embodiments, a protective structure (e.g., a protective structure formed by a method described herein, a composite protective structure) may comprise at least one oxide. In some embodiments, the protective structure may comprise two or more oxides. In some embodiments, one or more of the oxide(s) may be insoluble or sparingly soluble (e.g., less than 2 wt % soluble, less than 1 wt % soluble, less than 0.5 wt % soluble) in one or more fluids to which it is exposed (e.g., a fluid comprising a precursor for the protective structure, an electrolyte in an electrochemical cell comprising the protected electrode structure). The protective structure may comprise an oxide of a metal included in the electrode (e.g., an oxide of an alkali metal such as lithium). In some embodiments, the protective structure may comprise an oxide that exclusively comprises oxygen and a metal included in the electrode. For example, the protective structure may comprise $Li_2O$. In some embodiments, the protective structure may comprise an oxide that does not include a metal included in the electrode or is included in the electrode is small amounts (e.g., less than or equal to 10 wt %, less than or equal to 8 wt %, less than or equal to 6 wt %, less than or equal to 4 wt %, less than or equal to 2 wt %, or less than or equal to 1 wt % with respect to the weight of the electrode). Such oxides may comprise one or more of Sn, Zn, In, Al, Mg, Ga, Ag, Cd, Pb, Bi, Sb, Si, Ge, and As (e.g., ZnO, $In_2O_3$). In some embodiments, a protective structure may comprise both an alloy as described above and an oxide, and a metal or metalloid may be present in both the alloy and the oxide (e.g., the protective structure may comprise both LiZn and ZnO, where Zn is present in both the LiZn alloy and the ZnO oxide). In some embodiments, the oxide comprising the metal or metalloid may be a precursor that has not fully reacted with the electrode.

In some embodiments, a protective structure may comprise at least one oxide (e.g., $Li_2O$, ZnO), and the oxide may make up greater than or equal to 0.1 wt % of the protective structure, greater than or equal to 0.2 wt % of the protective structure, greater than or equal to 0.5 wt % of the protective structure, greater than or equal to 1 wt % of the protective structure, greater than or equal to 2 wt % of the protective structure, greater than or equal to 5 wt % of the protective structure, greater than or equal to 10 wt % of the protective structure, greater than or equal to 20 wt % of the protective structure, greater than or equal to 30 wt % of the protective structure, greater than or equal to 40 wt % of the protective structure, greater than or equal to 50 wt % of the protective structure, or greater than or equal to 60 wt % of the protective structure. In some embodiments, a protective structure comprises at least one oxide, and the oxide makes up less than or equal to 70 wt % of the protective structure, less than or equal to 60 wt % of the protective structure, less than or equal to 50 wt % of the protective structure, less than or equal to 40 wt % of the protective structure, less than or equal to 30 wt % of the protective structure, less than or equal to 20 wt % of the protective structure, less than or equal to 10 wt % of the protective structure, less than or equal to 5 wt % of the protective structure, less than or equal to 2 wt % of the protective structure, less than or equal to 1 wt % of the protective structure, less than or equal to 0.5 wt % of the protective structure, or less than or equal to 0.2 wt % of the protective structure. Combinations of the above-referenced ranges are also possible (e.g., greater than or equal to 0.1 wt % of the protective structure and less than or equal to 70 wt % of the protective structure, or greater than or equal to 10 wt % of the protective structure and less than or equal to 50 wt % of the protective structure). Other ranges are also possible.

In some embodiments, a protective structure (e.g., a protective structure formed by a method described herein, a composite protective structure) may comprise a halide salt, such as a fluoride salt. Other examples of halide salts include chloride salts, bromide salts, and iodide salts. The halide salt may comprise a metal included in the electrode (e.g., it may be a fluoride salt (e.g., LiF) of an alkali metal such as lithium). In some embodiments, the halide (e.g., fluoride) salt may be insoluble or sparingly soluble (e.g., less than 2 wt % soluble, less than 1 wt % soluble, less than 0.5 wt % soluble) in one or more fluids to which it is exposed (e.g., a fluid comprising a precursor for the protective structure, an electrolyte in an electrochemical cell comprising the protected electrode structure). When present, the halide salt (e.g., a fluoride salt) may make up any suitable amount of the protective structure. In some embodiments, the halide salt (e.g., a fluoride salt) makes up greater than or equal to 0.1 wt % of the protective structure, greater than or equal to 0.2 wt % of the protective structure, greater than or equal to 0.5 wt % of the protective structure, greater than or equal to 1 wt % of the protective structure, greater than or equal to 2 wt % of the protective structure, greater than or equal to 5 wt % of the protective structure, greater than or equal to 10 wt % of the protective structure, greater than or equal to 20 wt % of the protective structure, greater than or equal to 30 wt % of the protective structure, greater than or equal to 40 wt % of the protective structure, greater than or equal to 50 wt % of the protective structure, or greater than or equal to 60 wt % of the protective structure. In some embodiments, the fluoride salt makes up less than or equal to 70 wt % of the protective structure, less than or equal to 60 wt % of the protective structure, less than or equal to 50 wt % of the protective structure, less than or equal to 40 wt % of the protective structure, less than or equal to 30 wt % of the protective structure, less than or equal to 20 wt % of the protective structure, less than or equal to 10 wt % of the protective structure, less than or equal to 5 wt % of the protective structure, less than or equal to 2 wt % of the protective structure, less than or equal to 1 wt % of the protective structure, less than or equal to 0.5 wt % of the protective structure, or less than or equal to 0.2 wt % of the protective structure. Combinations of the above-referenced ranges are also possible (e.g., greater than or equal to 0.1 wt % of the protective structure and less than or equal to 70 wt % of the protective structure, or greater than or equal to 10 wt % of the protective structure and less than or equal to 50 wt % of the protective structure). Other ranges are also possible.

In some embodiments, a protective structure (e.g., a protective structure formed by a method described herein) may comprise elemental carbon. The elemental carbon may be in any suitable form, non-limiting examples of which include graphite, carbon nanotubes, carbon nanofibers, graphene, and graphene oxide. In some embodiments, the elemental carbon further comprises intercalated ions, such as intercalated ions of a metal included in the electrode (e.g., an alkali metal such as lithium). For example, the protective structure may comprise a lithium-carbon intercalation compound. Two examples of such materials are graphite comprising intercalated lithium (i.e., $Li_xC_6$) and lithium carbide. In some embodiments, the elemental carbon and any intercalated ions may make up a relatively large amount of the protective structure. For instance, the elemental carbon and any intercalated ions may make up greater than or equal to 75 wt %, greater than or equal to 90 wt %, greater than or equal to 95 wt %, greater than or equal to 99 wt %, or greater than or equal to 99.5 wt % of the protective structure. The elemental carbon and any intercalated ions may make up less than or equal to 100 wt % of the protective structure, less than or equal to 99.5 wt % of the protective structure, less than or equal to 99 wt % of the protective structure, less than or equal to 95 wt % of the protective structure, less than or equal to 90 wt % of the protective structure, or less than or equal to 75 wt % of the protective structure. Combinations of the above-referenced ranges are also possible (e.g., greater than or equal to 75 wt % of the protective structure and less than or equal to 100 wt % of the protective structure). Other ranges are also possible.

In some embodiments, a protective structure (e.g., a protective structure formed by a method described herein, a composite protective structure) may comprise a metal (e.g., a second metal) that is not alloyed with a metal (e.g., a first metal) that is included in the electrode (e.g., the second metal is not alloyed with an alkali metal such as lithium). Additionally or alternatively, a protective structure (e.g., a protective structure formed by a method described herein, a composite protective structure) may comprise a metal (e.g., a second metal) that does not form an alloy with a metal (e.g., a first metal) that is included in the electrode (e.g., the second metal does not form an alloy with an alkali metal such as lithium). In some embodiments, a protective structure (e.g., a protective structure formed by a method described herein, a composite protective structure) may comprise a metalloid that is not alloyed with a metal that is included in the electrode (e.g., the metalloid is not alloyed with an alkali metal such as lithium). Additionally or alternatively, a protective structure (e.g., a protective structure formed by a method described herein, a composite protective structure) may comprise a metalloid that does not form an alloy with a metal that is included in the electrode (e.g., the metalloid does not form an alloy with an alkali metal such as lithium). For instance, the metal (e.g., second metal) may be one or more of Cu, Ni, and Fe. The metal (e.g., second metal) may be in a metallic phase, in some embodiments. The metalloid may be in a metalloid phase, in some embodiments. In some embodiments, a metal (e.g., a second metal) or metalloid that is not alloyed with a metal that is included in the electrode may, advantageously, assist electronic conduction and/or function as a current collector.

As used herein, a metal (e.g., a second metal) does not form an alloy with another metal (e.g., a first metal) if, after being placed in direct contact with the metal (e.g., first metal) for a period of one hour at a temperature of 130° C., it does not form an alloy with the metal (e.g., first metal) observable by X-ray diffraction. As used herein, a metalloid does not form an alloy with a metal if, after being placed in direct contact with the metal for a period of one hour at a temperature of 130° C., it does not form an alloy with the metal observable by X-ray diffraction.

The metal (e.g., second metal) and/or the metalloid may be present in the protective structure in any suitable amount. In some embodiments, the metal or metalloid may make up greater than or equal to 1 wt % of the protective structure, greater than or equal to 2 wt % of the protective structure, greater than or equal to 5 wt % of the protective structure, greater than or equal to 10 wt % of the protective structure, greater than or equal to 20 wt % of the protective structure, greater than or equal to 50 wt % of the protective structure, greater than or equal to 70 wt % of the protective structure, greater than or equal to 90 wt % of the protective structure, greater than or equal to 95 wt % of the protective structure, greater than or equal to 97.5 wt % of the protective structure, or greater than or equal to 99 wt % of the protective structure. In some embodiments, the metal or metalloid may make up less than or equal to 100 wt % of the protective structure, less than or equal to 99 wt % of the protective structure, less than or equal to 97.5 wt % of the protective structure, less than or equal to 95 wt % of the protective structure, less than or equal to 90 wt % of the protective structure, less than or equal to 70 wt % of the protective structure, less than or equal to 50 wt % of the protective structure, less than or equal to 20 wt % of the protective structure, less than or equal to 10 wt % of the protective structure, less than or equal to 5 wt % of the protective structure, or less than or equal to 2 wt % of the protective structure. Combinations of the above-referenced ranges are also possible (e.g., greater than or equal to 1 wt % and less than or equal to 100 wt % of the protective structure). Other ranges are also possible. A protective structure (e.g., a protective structure formed by a method described herein, a composite protective structure) may have any suitable thickness. In some embodiments, the protective structure has a thickness of greater than or equal to 20 nm, greater than or equal to 50 nm, greater than or equal to 100 nm, greater than or equal to 500 nm, greater than or equal to 1 micron, or greater than or equal to 2 microns. In some embodiments, the protective structure has a thickness of less than or equal to 5 microns, less than or equal to 4 microns, less than or equal to 3 microns, less than or equal to 2 microns, less than or equal to 1 micron, less than or equal to 500 nm, less than or equal to 200 nm, less than or equal to 100 nm, or less than or equal to 50 nm. Combinations of the above-referenced ranges are also possible (e.g., greater than or equal to 20 nm and less than or equal to 5 microns). Other ranges are also possible.

In some embodiments, a protective structure (e.g., a protective structure formed by a method described herein, a composite protective structure) may comprise pores. In some cases, at least 50% of the pore volume, at least 75% of the pore volume, or at least 90% of the pore volume is made up of pores with a cross-sectional diameter of greater than or equal to 0.001 microns, greater than or equal to 0.002 microns, greater than or equal to 0.005 microns, greater than or equal to 0.01 microns, greater than or equal to 0.02 microns, greater than or equal to 0.05 microns, greater than or equal to 0.1 microns, or greater than or equal to 0.2 microns. In some cases, at least 50% of the pore volume, at least 75% of the pore volume, or at least 90% of the pore volume is made up of pores with a cross-sectional diameter of less than or equal to 0.5 microns, less than or equal to 0.2 microns, less than or equal to 0.1 microns, less than or equal to 0.05 microns, less than or equal to 0.02 microns, less than or equal to 0.01 microns, less than or equal to 0.005 microns, or less than or equal to 0.002 microns. Combinations of the above-referenced ranges are also possible (e.g., greater than or equal to 0.001 microns and less than or equal to 0.5 microns). Other ranges are also possible.

As used herein, the "cross-sectional diameter" of a pore refers to a cross-sectional diameter as measured using ASTM Standard Test D4284-07. One of ordinary skill in the art would be capable of calculating the distribution of cross-sectional diameters and the average cross-sectional diameter of the pores within a layer using mercury intrusion porosimetry as described in ASTM standard D4284-07, which is incorporated herein by reference in its entirety. For example, the methods described in ASTM standard D4284-92 can be used to produce a distribution of pore sizes plotted as the cumulative intruded pore volume as a function of pore diameter. To calculate the fraction of the total pore volume within the sample that is occupied by pores within a given range of pore diameters, one would: (1) calculate the area under the curve that spans the given range over the x-axis, and (2) divide the area calculated in step (1) by the total area under the curve. Optionally, in cases where the article includes pore sizes that lie outside the range of pore sizes that can be accurately measured using ASTM standard D4284-92, porosimetry measurements may be supplemented using BET surface analysis, as described, for example, in S. Brunauer, P. H. Emmett, and E. Teller, J. Am. Chem. Soc., 1938, 60, 309, which is incorporated herein by reference in its entirety.

In some aspects, a protective structure (e.g., a protective structure formed by a method described herein, a composite protective structure) may be porous. That is, at least an appreciable fraction of the volume of the protective structure may be made up of pores. In some embodiments, pores make up greater than or equal to 2 vol %, greater than or equal to 5 vol %, greater than or equal to 10 vol %, greater than or equal to 20 vol %, greater than or equal to 30 vol %, greater than or equal to 40 vol %, greater than or equal to 50 vol %, greater than or equal to 60 vol %, greater than or equal to 70 vol %, or greater than or equal to 80 vol % of the protective structure may be made up of pores. In some embodiments, pores make up less than or equal to 90 vol % of the protective structure, less than or equal to 80 vol % of the protective structure, less than or equal to 70 vol % of the protective structure, less than or equal to 60 vol % of the protective structure, less than or equal to 50 vol % of the protective structure less than or equal to 40 vol % of the protective structure, less than or equal to 30 vol % of the protective structure, or less than or equal to 20 vol % of the protective structure. Combinations of the above-referenced ranges are also possible (e.g., greater than or equal to 10 vol % and less than or equal to 90 vol %). Other ranges are also possible. Porosity can be determined, for example, by mercury porosimetry.

In some embodiments, a protective structure (e.g., a protective structure formed by a method described herein, a composite protective structure) may comprise particles. The particles may comprise one or more constituent materials of the protective structure (e.g., one or more of an alloy, an oxide, a fluoride salt, elemental carbon, a metal, and a metalloid).

When a protective structure (e.g., a protective structure formed by a method described herein, a composite protective structure) includes particles, the particles may have any suitable average cross-sectional diameter. As used herein, the cross-sectional diameter of a particle refers to the diameter of a sphere that encloses a volume that is equivalent to the volume of the particle. The average cross-sectional diameter of a plurality of particles refers to the number average cross-sectional diameter of the particles forming the plurality. The average cross-sectional diameter may be determined by SEM. In some embodiments, the particles have an average cross-sectional diameter of greater than or equal to 20 nm, greater than or equal to 50 nm, greater than or equal to 100 nm, greater than or equal to 500 nm, greater than or equal to 1 micron, or greater than or equal to 2 microns. In some embodiments, the particles have an average cross-sectional diameter of less than or equal to 5 microns, less than or equal to 4 microns, less than or equal to 3 microns, less than or equal to 2 microns, less than or equal to 1 micron, less than or equal to 500 nm, less than or equal to 200 nm, less than or equal to 100 nm, or less than or equal to 50 nm. Combinations of the above-referenced ranges are also possible (e.g., greater than or equal to 20 nm and less than or equal to 5 microns). Other ranges are also possible. In some embodiments, the particles (e.g., metal particles, metalloid particles, metal oxide particles, metalloid oxide particles) may comprise nanoparticles, which are particles with an average cross-sectional diameter of less than or equal to 1 micron.

In some embodiments, particles may make up a relatively large amount of a protective structure (e.g., a protective structure formed by a method described herein, a composite protective structure). For example, particles may make up greater than or equal to 50 wt % of the protective structure, greater than or equal to 60 wt % of the protective structure, greater than or equal to 70 wt % of the protective structure, greater than or equal to 80 wt % of the protective structure, greater than or equal to 90 wt % of the protective structure, greater than or equal to 95 wt % of the protective structure, greater than or equal to 97.5 wt % of the protective structure, greater than or equal to 99 wt % of the protective structure, or greater than or equal to 99.5 wt % of the protective structure. In some embodiments, particles may make up less than or equal to 100 wt % of the protective structure, less than or equal to 99.5 wt % of the protective structure, less than or equal to 99 wt % of the protective structure, less than or equal to 97.5 wt % of the protective structure, less than or equal to 95 wt % of the protective structure, less than or equal to 90 wt % of the protective structure, less than or equal to 80 wt % of the protective structure less than or equal to 70 wt % of the protective structure or less than or equal to 60 wt % of the protective structure. Combinations of the above-referenced ranges are also possible (e.g., greater than or equal to 50 wt % of the protective structure and less than or equal to 100 wt % of the protective structure). Other ranges are also possible.

In some embodiments, one or more (or substantially all) of the particles in the protective structure may have a core-shell structure. That is, the particles may have a structure where a constituent material or combination of constituent materials is mostly present within a central region of the particle and a different constituent material or combination of constituent materials is present in a region of the particle that surrounds the central region (e.g., forming a shell). In some embodiments, an alloy (e.g., an alloy of a metal included in the electrode, an alloy comprising an alkali metal such as lithium) may form the shell of the core-shell structure. In some embodiments, an oxide (e.g., an oxide of a metal included in the electrode, an oxide of an alkali metal such as lithium, an oxide of a metal included in an alloy) may form the core of the core-shell structure.

In some embodiments, a protective structure (e.g., a protective structure formed by a method described herein, a composite protective structure) may have a relatively high ionic conductivity. In certain embodiments, the protective structure may have an ionic conductivity of greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to 1 S/cm, or greater than or equal to 10 S/cm. In certain embodiments, the protective structure may have an ionic conductivity of less than or equal to 100 S/cm, less than or equal to 10 S/cm, less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, less than or equal to $10^{-5}$ S/cm, or less than or equal to $10^{-6}$ S/cm. Combinations of the above-referenced ranges are also possible (e.g., greater than or equal to $10^{-4}$ S/cm and less than or equal to 100 S/cm). Other ranges are also possible. The ionic conductivity of the protective structure may be determined using EIS.

Figure 2:
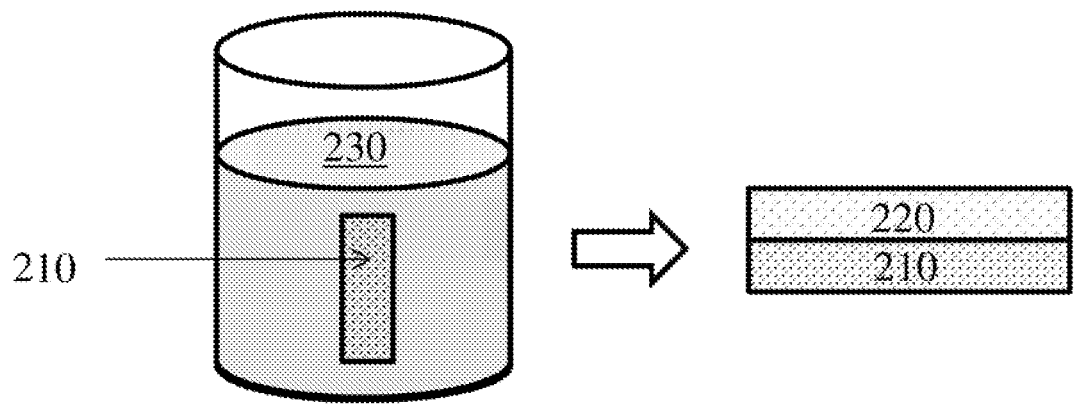
FIG. 2 shows a method for forming a protected electrode structure according to certain embodiments.

As described above, certain inventive methods relate to the formation of a protective structure (e.g., a composite protective structure) on an electrode. FIG. 2 shows one such method in accordance with certain embodiments. As depicted illustratively therein, a method may comprise exposing an electrode 210 to a fluid 230 (e.g., a liquid) and forming protective structure 220 on (e.g., directly adjacent to) electrode 210. While FIG. 2 shows exposure of the electrode to the fluid by immersing (e.g., dipping) the electrode in the fluid, other methods of exposing the electrode to the fluid are also possible. For example, the fluid may be sprayed or dripped onto the electrode. In some embodiments, the fluid may be coated onto the electrode. For instance, one or more of doctor-blade coating, slot-die coating, roll coating, and brush coating may be employed. In some embodiments, the fluid may be a liquid.

In some embodiments, an electrode is exposed to a fluid that comprises a plurality of particles. In some embodiments, the electrode is exposed to a fluid that comprises more than one plurality of particles. The particles may be particle precursors that transform into the protective structure and/or one or more components thereof. The particles may be suspended and/or dispersed within the fluid and may form a colloidal suspension in some embodiments. In some embodiments, the particles comprise a metal-containing species (e.g., a metal, a second metal as described herein) and/or a metalloid containing species. The metal-containing species or metalloid-containing species may be an oxide, such as a metal oxide or metalloid oxide. In some embodiments, the metal or metalloid may be one or more of Sn, Zn, In, Al, Mg, Ga, Ag, Cd, Pb, Bi, Sb, Si, Ge, and As (e.g., the metal-containing species may be ZnO, the metal-containing species may be alumina). In some embodiments, the metal-containing species (e.g., a metal, a second metal as described herein) or metalloid-containing species may comprise one or more metals in a metallic phase and/or metalloids in a metalloid phase. In some embodiments, the metal or metalloid may be one or more of Sn, Zn, In, Al, Mg, Ga, Ag, Cd, Pb, Bi, Sb, Si, Ge, As, Cu, Ni, and Fe. In some embodiments, some or all of the particles (e.g., the metal oxide or metalloid oxide particles, if present; the metallic metal and/or metalloid phase metalloid particles, if present) may be in the form of a powder. In some embodiments, the particles comprise elemental carbon, such as graphite, carbon nanotubes, carbon nanofibers, graphene, and/or graphene oxide. In some cases, the powder may be a fumed powder (e.g., a fumed alumina powder). In some embodiments, the powder may be a nanopowder (e.g., an aluminum nanopowder).

The particles, if present, may have any suitable average cross-sectional diameter. In some embodiments, the particles have an average cross-sectional diameter of greater than or equal to 20 nm, greater than or equal to 50 nm, greater than or equal to 100 nm, greater than or equal to 500 nm, greater than or equal to 1 micron, or greater than or equal to 2 microns. In some embodiments, the particles have an average cross-sectional diameter of less than or equal to 5 microns, less than or equal to 2 microns, less than or equal to 1 micron, less than or equal to 500 nm, less than or equal to 200 nm, less than or equal to 100 nm, or less than or equal to 50 nm. Combinations of the above-referenced ranges are also possible (e.g., greater than or equal to 20 nm and less than or equal to 5 microns). Other ranges are also possible. In some embodiments, the particles (e.g., metal particles, metalloid particles, metal oxide particles, metalloid oxide particles) may comprise nanoparticles, which are particles with an average cross-sectional diameter of less than or equal to 1 micron. The average cross-sectional diameter may be determined by SEM.

When present, the particles (e.g., particles that comprise a metal-containing species or a metalloid-containing species, particles that comprise elemental carbon) may make up any suitable amount of the fluid to which the electrode is exposed. For instance, the particles may make up greater than or equal to 0.5 wt %, greater than or equal to 1 wt %, greater than or equal to 2 wt %, greater than or equal to 5 wt %, greater than or equal to 10 wt %, or greater than or equal to 20 wt % of the fluid to which the electrode is exposed. The particles may make up less than or equal to 30 wt %, less than or equal to 20 wt %, less than or equal to 10 wt %, less than or equal to 5 wt %, less than or equal to 2 wt %, or less than or equal to 1 wt % of the fluid to which the electrode is exposed. Combinations of the above-referenced ranges are also possible (e.g., greater than or equal to 0.5 wt % and less than or equal to 30 wt %). Other ranges are also possible.

In some embodiments, the electrode is exposed to a fluid that comprises a fluoride salt, such as a metal fluoride salt or a metalloid fluoride salt. For example, the fluoride salt may comprise one or more of Sn, Zn, In, Al, Mg, Ga, Ag, Cd, Pb, Bi, Sb, Si, Ge, and As (e.g., $SbF_3$, $SnF_2$). In some embodiments, the fluoride salt may be dissolved in the fluid. In some embodiments, a cation of the fluoride salt may form a complex with a component (e.g., a solvent) present in the fluid (e.g., the fluid may include pyridine and Sn(II) ions, and Sn(II) ions may form a complex with pyridine).

When present, the fluoride salt (e.g., metal fluoride salt, metalloid fluoride salt) may make up any suitable amount of the fluid to which the electrode is exposed. For instance, the particles may make up greater than or equal to 0.5 wt %, greater than or equal to 1 wt %, greater than or equal to 2 wt %, greater than or equal to 5 wt %, greater than or equal to 10 wt %, or greater than or equal to 20 wt % of the fluid to which the electrode is exposed. The fluoride salt may make up less than or equal to 30 wt %, less than or equal to 20 wt %, less than or equal to 10 wt %, less than or equal to 5 wt %, less than or equal to 2 wt %, or less than or equal to 1 wt % of the fluid to which the electrode is exposed. Combinations of the above-referenced ranges are also possible (e.g., greater than or equal to 0.5 wt % and less than or equal to 30 wt %). Other ranges are also possible.

In some embodiments, the electrode is exposed to a fluid that comprises a first plurality of particles comprising a metal in a metallic phase and comprises a second plurality of particles comprising a metal in a non-metallic phase. The metal in the non-metallic phase may be a component of a halide salt (e.g., a fluoride salt) and/or a component of an oxide. The first plurality of particles may comprise a metal (e.g., a second metal) that does not form an alloy with a metal (e.g., a first metal) that is included in the electrode (e.g., the second metal does not form an alloy with an alkali metal such as lithium). Additionally or alternatively, the first plurality of particles may comprise a metal (e.g., a third metal) that forms an alloy with a metal (e.g., a first metal) that is included in the electrode (e.g., the third metal forms an alloy with an alkali metal such as lithium). The first plurality of particles may comprise a metal in a metallic phase that is the same type of metal as metal in a non-metallic phase included in the second plurality of particles (e.g., the first plurality of particles may comprise zinc and the second plurality of particles may comprise zinc oxide; the first plurality of particles may comprise zinc and the second plurality of particles may comprise zinc fluoride). Additionally or alternatively, the first plurality of particles may comprise a metal that is a different type of metal than a type of metal in a non-metallic phase included in the second plurality of particles (e.g., the first plurality of particles may comprise copper, and the second plurality of particles may comprise zinc oxide; the first plurality of particles may comprise copper, and the second plurality of particles may comprise zinc fluoride). In some embodiments, the first plurality of particles may comprise a metal in a metallic phase that is the same type of metal as a metal in a non-metallic phase included in the second plurality of particles and may comprise a metal in a metallic phase that is a different type of metal than the metal in a non-metallic phase included in the second plurality of particles (e.g., the first plurality of particles may comprise copper and zinc, and the second plurality of particles may comprise zinc oxide; the first plurality of particles may comprise copper and zinc, and the second plurality of particles may comprise zinc fluoride). Additionally or alternatively, the first plurality of particles may comprise a metal in a metallic phase that is the same type of metal as a metal in a non-metallic phase included in the second plurality of particles and the second plurality of particles may further comprise a different type of metal in a non-metallic phase (e.g., the first plurality of particles may comprise copper, and the second plurality of particles may comprise zinc oxide and magnesium oxide; the first plurality of particles may comprise copper, and the second plurality of particles may comprise zinc fluoride and magnesium fluoride; the first plurality of particles may comprise copper, and the second plurality of particles may comprise zinc oxide and magnesium fluoride).

In some embodiments, the electrode is exposed to a fluid that comprises a first plurality of particles comprising a metalloid in a metalloid phase and comprises a second plurality of particles comprising a metalloid in a non-metalloid phase. The metalloid in a non-metalloid phase may be a component of a halide salt (e.g., a fluoride salt) and/or a component of an oxide. The first plurality of particles may comprise a metalloid that does not form an alloy with a metal that is included in the electrode (e.g., the metalloid does not form an alloy with an alkali metal such as lithium). Additionally or alternatively, the first plurality of particles may comprise a metalloid that forms an alloy with a metal that is included in the electrode (e.g., the metalloid forms an alloy with an alkali metal such as lithium). The first plurality of particles may comprise a metalloid in a metalloid phase that is the same type of metalloid as metalloid in a non-metalloid phase included in the second plurality of particles (e.g., the first plurality of particles may comprise aluminum and the second plurality of particles may comprise alumina; the first plurality of particles may comprise an aluminum nanopowder and the second plurality of particles may comprise a fumed alumina powder; the first plurality of particles may comprise aluminum and the second plurality of particles may comprise aluminum fluoride). Additionally or alternatively, the first plurality of particles may comprise a metalloid that is a different type of metalloid than a type of metalloid in a non-metalloid phase included in the second plurality of particles (e.g., the first plurality of particles may comprise antimony, and the second plurality of particles may comprise alumina; the first plurality of particles may comprise antimony, and the second plurality of particles may comprise aluminum fluoride). In some embodiments, the first plurality of particles may comprise a metalloid in a metalloid phase that is the same type of metalloid as a metalloid in a non-metalloid phase included in the second plurality of particles and may comprise a metalloid in a metalloid phase that is a different type of metalloid than the metalloid in a non-metalloid phase included in the second plurality of particles (e.g., the first plurality of particles may comprise alumina and antimony, and the second plurality of particles may comprise alumina; the first plurality of particles may comprise alumina and antimony, and the second plurality of particles may comprise aluminum fluoride). Additionally or alternatively, the first plurality of particles may comprise a metalloid in a metalloid phase that is the same type of metalloid as a metalloid in a non-metalloid phase included in the second plurality of particles and the second plurality of particles may further comprise a different type of metalloid in a non-metalloid phase (e.g., the first plurality of particles may comprise aluminum, and the second plurality of particles may comprise alumina and an antimony oxide; the first plurality of particles may comprise aluminum, and the second plurality of particles may comprise aluminum fluoride and an antimony fluoride; the first plurality of particles may comprise aluminum, and the second plurality of particles may comprise alumina and an antimony fluoride).

Without wishing to be bound by any particular theory, it is believed that the combination of a first plurality of particles comprising a metal in a metallic phase or a metalloid in a metalloid phase and a second plurality of particles comprising a metal in a non-metallic phase or a metalloid in a non-metalloid phase may be particularly advantageous. Such combinations may be formulated to result in the formation of a protective structure (e.g., a protective structure formed by a method described herein, a composite protective structure) with desired relative amounts of electronically conductive portions and electronically insulating portions. The electronically conductive portions are formed from the first plurality of particles, and from the metal or metalloid species in the second plurality of particles that react to form an alloy with a metal that is included in the electrode (e.g., an alloy comprising a metal that is included in the electrode). The electronically insulating portions are formed from unreacted metal or metalloid species in the second plurality of particles, and from metal that is included in the electrode that reacts with the component to which the metal or metalloid in the second plurality of particles is initially bound (e.g., an oxide of the metal that is included in the electrode, a fluoride salt of a metal that is included in the electrode).

In some embodiments, the fluid to which the electrode is exposed may comprise one or more protic solvent. That is, the fluid may comprise a solvent with a hydrogen atom bonded to an oxygen atom and/or a hydrogen atom bonded to a nitrogen atom. Non-limiting examples of protic solvents include ethanol, methanol, propanol, isopropanol, acetic acid, and ethylene glycol. Other protic solvents are also possible. In some embodiments, the protic solvent(s) may make up greater than or equal to 1 wt % of the fluid, greater than or equal to 2 wt % of the fluid, greater than or equal to 5 wt % of the fluid, greater than or equal to 10 wt % of the fluid, or greater than or equal to 15 wt % of the fluid. In some embodiments, the protic solvent(s) may make up less than or equal to 20 wt % of the fluid, less than or equal to 15 wt % of the fluid, less than or equal to 10 wt % of the fluid, less than or equal to 5 wt % of the fluid, or less than or equal to 2 wt % of the fluid. Combinations of the above-referenced ranges are also possible (e.g., greater than or equal to 1 wt % and less than or equal to 20 wt %). Other ranges are also possible.

In some embodiments, the fluid may comprise one or more aprotic solvents. The aprotic solvent(s) may include, for example, polar aprotic solvents (e.g., pyridine, dimethyl carbonate, propylene glycol mono-methyl ether acetate, dimethyl sulfoxide, N,N'-dimethyl acetamide, methyl ethyl ketone, methyl isobutyl ketone, diethyl ether, tetrahydrofuran, 2-methyl tetrahydrofuran, diethoxyethane, 1,3-dioxolane, diethyl carbonate, ethyl methyl carbonate, methyl formate, butyl acetate, methyl acetate, acetonitrile, nitromethane) and/or nonpolar aprotic solvents (e.g., n-hexane, toluene, n-butane, n-heptane). Other aprotic solvents are also possible. In some embodiments, the aprotic solvent(s) may make up greater than or equal to 50 wt % of the fluid, greater than or equal to 75 wt % of the fluid, greater than or equal to 90 wt % of the fluid, or greater than or equal to 95 wt % of the fluid. In some embodiments, the aprotic solvent(s) may make up less than or equal to 99 wt % of the fluid, less than or equal to 95 wt % of the fluid, less than or equal to 90 wt % of the fluid, or less than or equal to 75 wt % of the fluid. Combinations of the above-referenced ranges are also possible (e.g., greater than or equal to 50 wt % of the fluid and less than or equal to 99 wt % of the fluid). Other ranges are also possible.

In some embodiments, a fluid may comprise at least one protic solvent and at least one aprotic solvent. In such embodiments, the aprotic solvent(s) may make up any suitable wt % of the solvents present. In some embodiments, the protic solvent(s) may make up greater than or equal to 1 wt % of the solvents present, greater than or equal to 2 wt % of the solvents present, greater than or equal to 5 wt % of the solvents present, greater than or equal to 10 wt % of the solvents present, or greater than or equal to 15 wt % of the solvents present. In some embodiments, the protic solvent(s) may make up less than or equal to 20 wt % of the solvents present, less than or equal to 15 wt % of the solvents present, less than or equal to 10 wt % of the solvents present, less than or equal to 5 wt % of the solvents present, or less than or equal to 2 wt % of the solvents present. Combinations of the above-referenced ranges are also possible (e.g., greater than or equal to 1 wt % and less than or equal to 20 wt %). Other ranges are also possible.

In some embodiments, a method for forming a protective structure may comprise heating an electrode or protected electrode (e.g., after exposing the electrode to the fluid). Heating may comprise placing the electrode or protected electrode structure in an environment where the ambient temperature is greater than or equal to 60° C., greater than or equal to 80° C., greater than or equal to 100° C., greater than or equal to 120° C., greater than or equal to 140° C., greater than or equal to 160° C., greater than or equal to 180° C., greater than or equal to 200° C., or greater than or equal to 220° C. Heating may comprise placing the electrode or protected electrode structure in an environment where the ambient temperature is less than or equal to 240° C., less than or equal to 220° C., less than or equal to 200° C., less than or equal to 180° C., less than or equal to 160° C., less than or equal to 140° C., less than or equal to 120° C., less than or equal to 100° C., or less than or equal to 80° C. Combinations of the above-referenced ranges are also possible (e.g., greater than or equal to 60° C. and less than or equal to 240° C.). Other ranges are also possible.

Heating may be accomplished at any suitable pressure. In some embodiments, an electrode or protected electrode may be heated while subject to a reduced (e.g., vacuum) pressure. The reduced pressure may be less than or equal to 760 torr, less than or equal to 700 torr, less than or equal to 500 torr, less than or equal to 200 torr, less than or equal to 100 torr, less than or equal to 50 torr, less than or equal to 20 torr, less than or equal to 10 torr, less than or equal to 5 torr, less than or equal to 2 torr, less than or equal to 1 torr, less than or equal to 0.5 torr, less than or equal to 0.2 torr, less than or equal to 0.1 torr, less than or equal to 0.05 torr, or less than or equal to 0.02 torr. The reduced pressure may be greater than or equal to 0.01 torr, greater than or equal to 0.02 torr, greater than or equal to 0.05 torr, greater than or equal to 0.1 torr, greater than or equal to 0.2 torr, greater than or equal to 0.5 torr, greater than or equal to 1 torr, greater than or equal to 2 torr, greater than or equal to 5 torr, greater than or equal to 10 torr, greater than or equal to 20 torr, greater than or equal to 50 torr, greater than or equal to 100 torr, greater than or equal to 200 torr, greater than or equal to 500 torr, or greater than or equal to 700 torr. Combinations of the above-referenced ranges are also possible (e.g., greater than or equal to 0.01 torr and less than or equal to 760 torr). Other ranges are also possible.

As described above, in some embodiments a protective structure may be formed on an electrode. In some embodiments, the electrode may be an anode. In some embodiments, the electrode comprises an alkali metal. The alkali metal may be lithium (e.g., lithium metal), such as lithium foil, lithium deposited onto a conductive substrate, and lithium alloys (e.g., lithium-aluminum alloys and lithium-tin alloys). Lithium can be contained as one film or as several films, optionally separated. Suitable lithium alloys for use in the aspects described herein can include alloys of lithium and aluminum, magnesium, silicium (silicon), indium, and/or tin.

In some embodiments, the electrode contains at least 50 wt % lithium. In some cases, the electrode contains at least 75 wt %, at least 90 wt %, at least 95 wt %, or at least 99 wt % lithium. In some embodiments, the anode active material contains at least 50 wt % lithium. In some cases, the anode active material contains at least 75 wt %, at least 90 wt %, at least 95 wt %, or at least 99 wt % lithium.

In some embodiments, the electrode is an electrode from which a lithium ion is liberated during discharge and into which the lithium ion is integrated (e.g., intercalated) during charge. In some embodiments, the electrode is a lithium intercalation compound (e.g., a compound that is capable of reversibly inserting lithium ions at lattice sites and/or interstitial sites). In some embodiments, the electrode comprises carbon. In certain cases, the electrode is or comprises a graphitic material (e.g., graphite). A graphitic material generally refers to a material that comprises a plurality of layers of graphene (e.g., layers comprising carbon atoms arranged in a hexagonal lattice). Adjacent graphene layers are typically attracted to each other via van der Waals forces, although covalent bonds may be present between one or more sheets in some cases. In some cases, the carbon-comprising material of the electrode is or comprises coke (e.g., petroleum coke). In certain embodiments, the electrode comprises silicon, lithium, and/or any alloys of combinations thereof. In certain embodiments, the electrode comprises lithium titanate ($Li_4Ti_5O_{12}$, also referred to as "LTO"), tin-cobalt oxide, or any combinations thereof.

In some embodiments, a surface of the electrode (e.g., a surface to be exposed to a fluid, a surface directly adjacent a protective structure) may be passivated. Without wishing to be bound by theory, electrode surfaces that are passivated are surfaces that have undergone a chemical reaction to form a layer that is less reactive (e.g., with an ambient atmosphere, with a fluid, with an electrolyte) than material that is present in the bulk of the electrode. One method of passivating an electrode surface is to expose the electrode to a plasma comprising $CO_2$ and/or $SO_2$ to form a $CO_2$- or $SO_2$-induced layer. Certain inventive methods and articles may comprise passivating an electrode by exposing it to $CO_2$ and/or $SO_2$, or an electrode with a surface that has been passivated by exposure to $CO_2$ and/or $SO_2$. Such exposure may form a porous passivation layer on the electrode (e.g., a $CO_2$- or $SO_2$-induced layer).

In some embodiments, an electrode or protected electrode structure as described herein has not been cycled, or has been cycled a minimal number of times. For instance, the electrode or protected electrode structure may have been cycled fewer than 10 times, 5 times, or 2 times.

In some embodiments, an electrode or protected electrode structure as described herein may be one component of an electrochemical cell. The electrochemical cell may comprise additional components commonly associated with electrochemical cells (e.g., electrolytes, separators, second electrodes, current collectors), some of which are described in more detail below.

The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode.

In some embodiments, the electrolyte may comprise a non-solid electrolyte.

Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. patent application Ser. No. 12/312,764, filed May 26, 2009 and entitled "Separation of Electrolytes," by Mikhaylik et al., which is incorporated herein by reference in its entirety.

In some embodiments, an electrolyte may be used in the electrochemical cells described herein. Generally, the choice of electrolyte will depend upon the chemistry of the electrochemical cell, and, in particular, the species of ion that is to be transported between electrodes in the electrochemical cell. Suitable electrolytes can comprise, in some embodiments, one or more ionic electrolyte salts to provide ionic conductivity and one or more liquid electrolyte solvents. Examples of useful non-aqueous electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes (e.g., 1,3-dioxolane), N-alkylpyrrolidones, bis(trifluoromethanesulfonyl)imide, substituted forms of the foregoing, and blends thereof. Fluorinated derivatives of the foregoing are also useful as liquid electrolyte solvents.

In some cases, aqueous solvents can be used as electrolytes (e.g., for lithium cells). Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, polysulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume. The percentages above should be understood to refer to the percentage of the volume of the heterogeneous electrolyte that is occupied by a gel polymer electrolyte.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

The electrolyte can comprise one or more ionic electrolyte salts to provide ionic conductivity and one or more liquid electrolyte solvents, gel polymer materials, polymer materials, or liquid-containing materials. In some embodiments, one or more lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$) can be included. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from about 0.2 m to about 2.0 m (m is moles/kg of solvent). In some embodiments, a concentration in the range between about 0.5 m to about 1.5 m is used.

In some embodiments, electrochemical cells may further comprise a separator interposed between the protected electrode structure and a second electrode. In some embodiments, one or more cell components described above (such as, e.g., a first insulating layer, a second insulating layer, etc.) may be a separator. The separator may be a solid non-conductive or insulative material which separates or insulates the anode and the cathode from each other preventing short circuiting, and which permits the transport of ions between the anode and the cathode. In some embodiments, the porous separator may be permeable to the electrolyte.

The pores of the separator or separators may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use according to certain embodiments are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

In some embodiments, an electrochemical cell comprising a protected electrode structure as described herein may further comprise a second electrode, such as a cathode. The second electrode may comprise a lithium intercalation compound (e.g., a compound that is capable of reversibly inserting lithium ions at lattice sites and/or interstitial sites). In certain cases, the second electrode comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the second electrode comprises a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the second electrode comprises a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In certain cases, the second electrode comprises $Li_{1.14}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the second electrode comprises a conversion compound. For instance, the second electrode may be a lithium conversion electrode/cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the second electrode may comprise a material that is doped with one or more dopants to alter the electrical properties (e.g., electrical conductivity) of the electrode active material. Non-limiting examples of suitable dopants include aluminum, niobium, silver, and zirconium.

In certain embodiments, the second electrode can comprise sulfur. In some embodiments, the second electrode can comprise electrode active sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electrode active sulfur-containing material may comprise elemental sulfur (e.g., $S_8$). In some embodiments, the electrode active sulfur-containing material comprises a mixture of elemental sulfur and a sulfur-containing polymer. Thus, suitable electrode active sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electrode active sulfur-containing material within a second electrode (e.g., a cathode) comprises at least about 40 wt % sulfur. In some cases, the electrode active sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electrode active sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electrode active sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

In some embodiments, the use of certain protected electrode structures described herein may result in improved capacity after repeated cycling of the electrochemical cell. For example, in some embodiments, after alternatively discharging and charging the cell three times, the cell exhibits at least about 50%, at least about 80%, at least about 90%, or at least about 95% of the cell's initial capacity at the end of the third cycle. In some cases, after alternatively discharging and charging the cell ten times, the cell exhibits at least about 50%, at least about 80%, at least about 90%, or at least about 95% of the cell's initial capacity at the end of the tenth cycle. In still further cases, after alternatively discharging and charging the cell twenty-five times, the cell exhibits at least about 50%, at least about 80%, at least about 90%, or at least about 95% of the cell's initial capacity at the end of the twenty-fifth cycle.

EXAMPLES

The examples presented herein describe the formation of protected electrode structures on lithium electrodes.

Unless otherwise specified, the following procedure was followed in a dry room. Lithium which had been formed by vapor deposition and then passivated by $CO_2$ was dipped into a bath solution (shown in Table 1) for approximately 10 seconds and then withdrawn. Then, the sample was held in ambient air for a time period shown in Table 1, by which point the solvent had fully evaporated. During this time period, the lithium surface became darker and curled away from the coating for Examples 1-3. Next, the sample was placed into a vacuum oven preset at 130° C. and held at this temperature for a time period shown in Table 1. After this step, the sample was unloaded and allowed to cool to room temperature under dry air. After the protective structure had been formed by the above process, the sample was imaged using scanning electron microscopy (SEM) and analyzed using X-ray diffraction. Example 6 only was stored under Argon for two months prior to X-ray diffraction analysis.

TABLE 1

Bath solutions.

| Example | Salt or particle (concentration) | Solvent | Evaporation time | Heating time |
|---|---|---|---|---|
| Example 1 | $SbF_3$ (0.5M) | 10 vol % methanol; 90 vol % dimethyl carbonate | 3 minutes | 10 minutes |
| Example 2 | $SnF_2$ (0.5M) | Pyridine | 3 minutes | 10 minutes |
| Example 3 | $SnF_2$ (0.33M); $SbF_3$ (0.17M) | 25 vol % methanol; 75 vol % pyridine | 3 minutes | 10 minutes |
| Example 4 | ZnO nanoparticles (4 wt %) | 6.25 wt % ethanol; 93.75 wt % dimethyl carbonate | 3 minutes | 30 minutes |
| Example 5 | Colloidal graphite (5 wt %) | 47 wt % n-heptane, 16 wt % propane, 16 wt % butane, 16 wt % 2-propanol, and 5 wt % toluene | 1 minute | 60 minutes |
| Example 6 | $Al_2O_3$ nanoparticles (20 wt %) | Isopropanol | 3 minutes | 60 minutes |

Figure 3A:
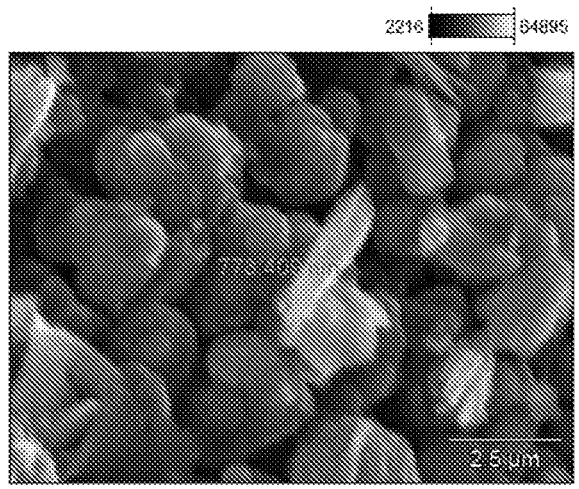
FIG. 3A shows a SEM image of a protective structure that is a protective layer according to certain embodiments.
Figure 3B:
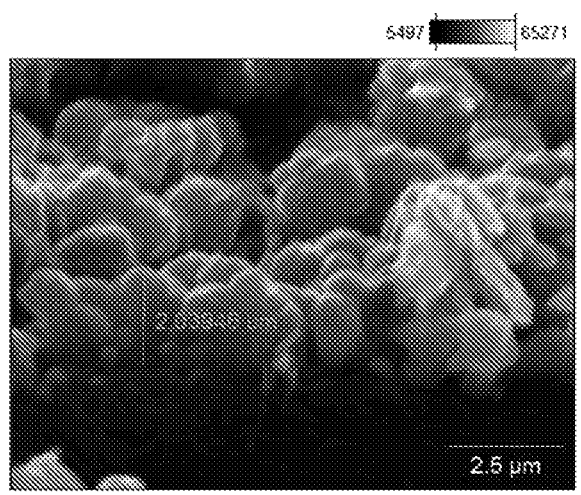
FIG. 3B shows a SEM image of a protective structure that is a protective layer according to certain embodiments.
Figure 4A:
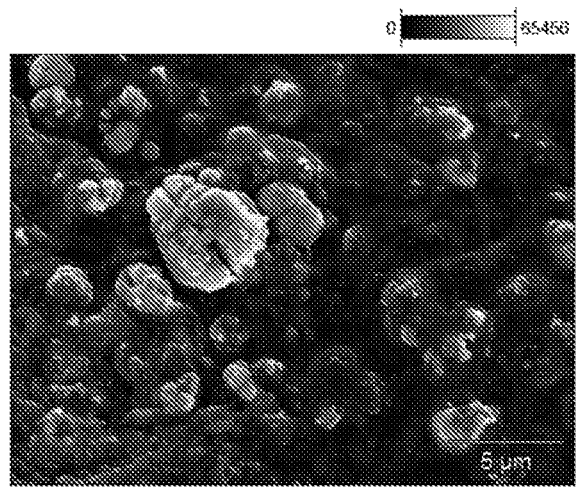
FIG. 4A shows a SEM image of a protective structure that is a protective layer according to certain embodiments.
Figure 4B:
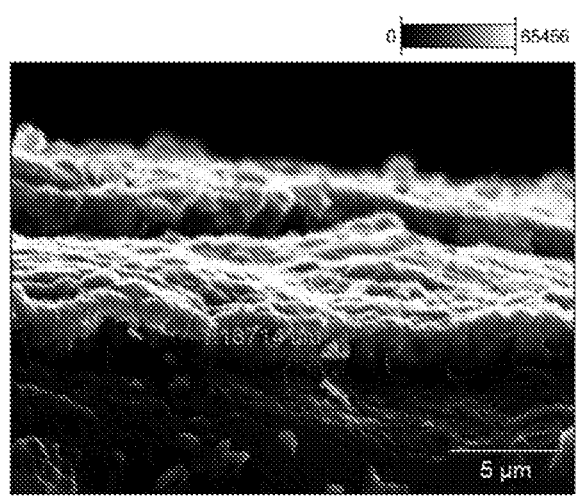
FIG. 4B shows a SEM image of a protective structure that is a protective layer according to certain embodiments.
Figure 5A:
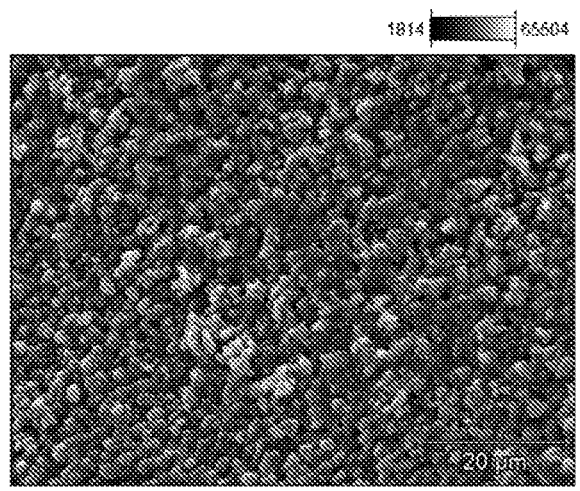
FIG. 5A shows a SEM image of a protective structure that is a protective layer according to certain embodiments.
Figure 5B:
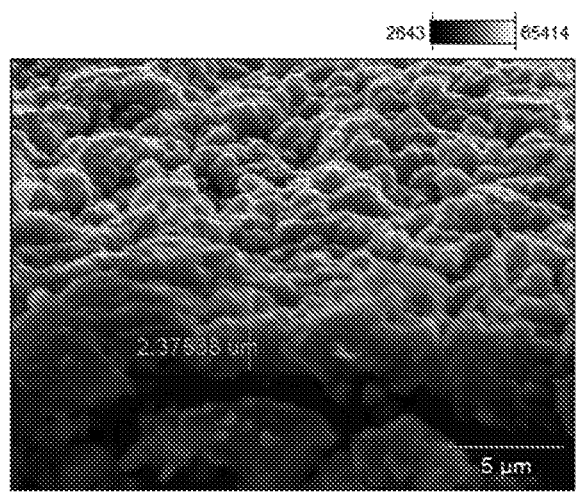
FIG. 5B shows a SEM image of a protective structure that is a protective layer according to certain embodiments.
Figure 6A:
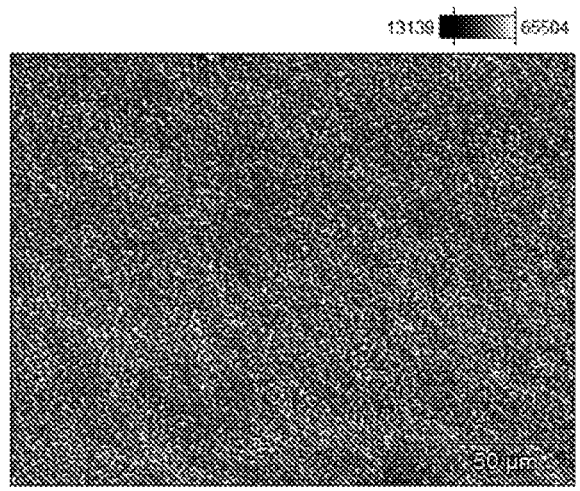
FIG. 6A shows a SEM image of a protective structure that is a protective layer according to certain embodiments.
Figure 6B:
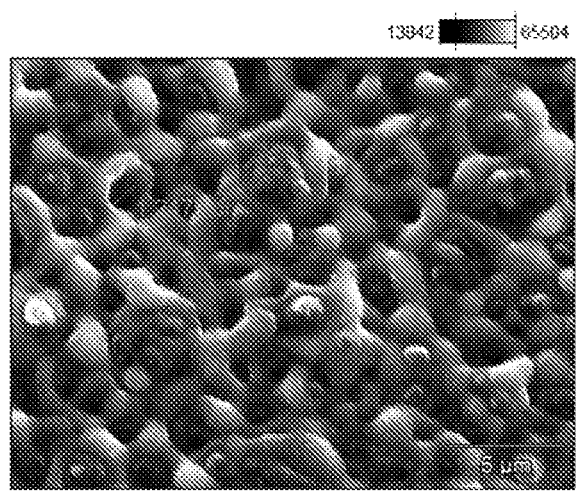
FIG. 6B shows a SEM image of a protective structure that is a protective layer according to certain embodiments.
Figure 6C:
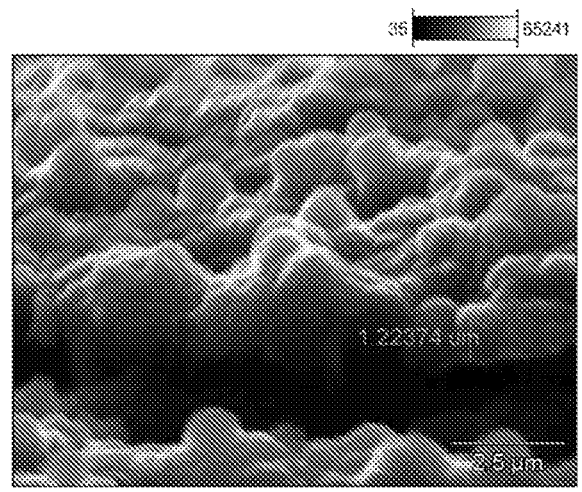
FIG. 6C shows a SEM image of a protective structure that is a protective layer according to certain embodiments.
Figure 7A:
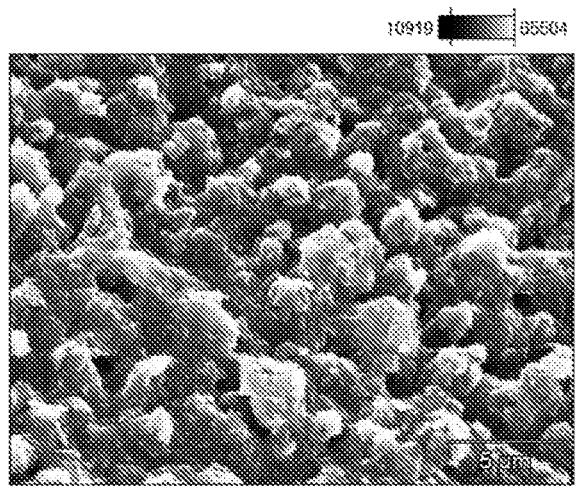
FIG. 7A shows a SEM image of a protective structure that is a protective layer according to certain embodiments.
Figure 7B:
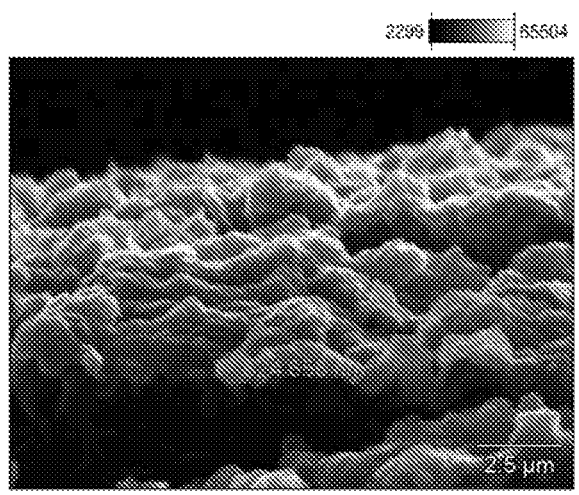
FIG. 7B shows a SEM image of a protective structure that is a protective layer according to certain embodiments.
Figure 8A:
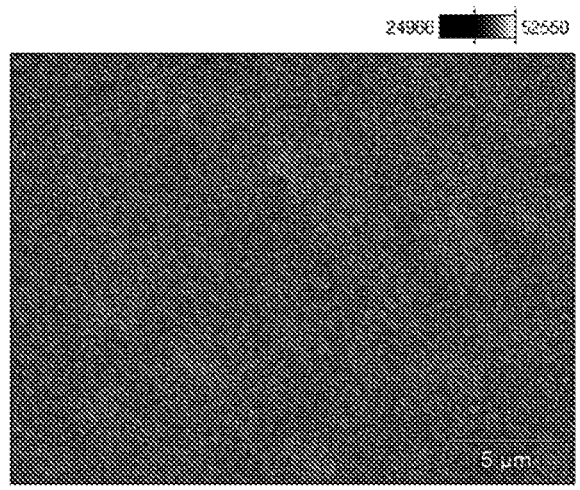
FIG. 8A shows a SEM image of a protective structure that is a protective layer according to certain embodiments.
Figure 8B:
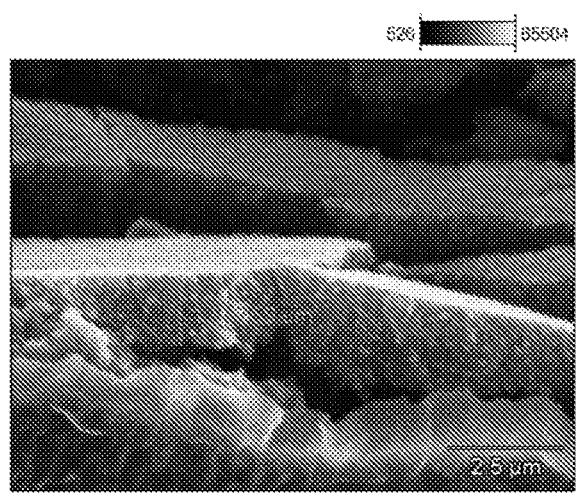
FIG. 8B shows a SEM image of a protective structure that is a protective layer according to certain embodiments.

SEM images of the protective structures showed that they formed particulate films (see FIGS. 3A-3B for Example 1; FIGS. 4A-4B for Example 2; FIGS. 5A-5B for Example 3; FIGS. 6A-6C for Example 4; FIGS. 7A-7B for Example 5; FIGS. 8A-8B for Example 6).

X-ray diffraction data from the protective structures indicated that they comprised a variety of compounds, including lithium alloys, fluoride salts, oxides, and elemental carbon. Although not detected by X-ray diffraction, lithium fluoride is expected to have formed from a metathesis reaction between the lithium and the metal fluoride salt in Examples 1-3, and lithium oxide is expected to have formed from a metathesis reaction between the lithium and the metal oxide particles in Examples 4 and 6. Table 2 shows the composition of each protective structure calculated based on X-ray diffraction peak intensities.

TABLE 2

Protective structure compositions.

| Example | Protective structure composition |
|---|---|
| Example 1 | 42 wt % $Li_3Sb$; 54 wt % $SbF_3$; 4 wt % Sb |
| Example 2 | 90 wt % $Li_4Sn$; 10 wt % $SnO_2$ |
| Example 3 | Comprises Li—Sn and Li—Sb alloys |
| Example 4 | 36 wt % LiZn; 25 wt % $LiZn_{13}$; 39 wt % ZnO |
| Example 5 | 2 wt % $Li_3C_{24}$; 98 wt % graphite |
| Example 6 | 3.7 wt % $LiAl_3$, 9.9 wt % $LiAlO_2$, 86.4 wt % $Al_2O_3$ |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A protected electrode structure, comprising:
an electrode comprising an alkali metal; and
a composite protective structure directly adjacent the electrode, wherein the composite protective structure comprises:
an alloy comprising the alkali metal; and
a fluoride salt of the alkali metal,
wherein the fluoride salt of the alkali metal makes up greater than or equal to 0.1 wt % of the composite protective structure, and
wherein the composite protective structure comprises particles having a core-shell structure.

2. A protected electrode structure as in claim 1, wherein the composite protective structure comprises pores.

3. A protected electrode structure as in claim 1, wherein the composite protective structure is substantially impermeable to an electrolyte.

4. A protected electrode structure as in claim 1, wherein the alloy forms the shell of the core-shell structure.

5. A protected electrode structure as in claim 1, wherein the alkali metal comprises lithium.

6. A protected electrode structure as in claim 1, wherein the particles comprise a metal-containing species.

7. A protected electrode structure as in claim 6, wherein the metal-containing species comprises at least one of Sn, Zn, In, Al, Mg, Ga, Ag, Cd, Pb, and Bi.

8. A protected electrode structure as in claim 1, wherein the alloy comprises at least one of Sn, Zn, In, Al, Mg, Ga, Ag, Cd, Pb, Bi, Sb, Si, Ge, and As.

9. A protected electrode structure as in claim 1, wherein the particles have an average size of greater than or equal to 5 nm and less than or equal to 2 microns.

10. A protected electrode structure as in claim 1, wherein the composite protective structure comprises an oxide of the alkali metal that makes up greater than or equal to 0.1 wt % of the protective structure and less than or equal to 70 wt % of the protective structure.

11. A protected electrode structure as in claim 10, wherein the oxide of the alkali metal makes up greater than or equal to 10 wt % of the composite protective structure and less than or equal to 50 wt % of the protective structure.

12. A protected electrode structure as in claim 1, wherein the fluoride salt of the alkali metal makes up greater than or equal to 0.1 wt % of the composite protective structure and less than or equal to 50 wt % of the protective structure.

13. A protected electrode structure as in claim 1, wherein the composite protective structure has a thickness of at least 20 nm and less than or equal to 5 microns.

14. A protected electrode as in claim 1, wherein the composite protective structure further comprises a metal-containing species in a metallic phase or a metalloid-containing species in a metalloid phase.

15. A protected electrode as in claim 14, wherein the metal-containing species in the metallic phase comprises a metal that does not form an alloy with the alkali metal.

16. A protected electrode structure as in claim 14, wherein the metal-containing species in the metallic phase comprises at least one of Cu, Ni, and Fe.

17. A method of forming a protected electrode, comprising:
- exposing an electrode comprising an alkali metal to a liquid comprising a metal fluoride salt or a metalloid fluoride salt; and
- forming a composite protective structure on the electrode, wherein the composite protective structure comprises an alloy comprising the alkali metal and a fluoride salt of the alkali metal wherein the fluoride salt of the alkali metal makes up greater than or equal to 0.1 wt % of the composite protective structure, and
- wherein the composite protective structure comprises particles having a core-shell structure.

* * * * *